United States Patent [19]

Guenot et al.

[11] Patent Number: 4,841,365
[45] Date of Patent: Jun. 20, 1989

[54] ARRANGEMENT FOR RECEIVING NUMERICAL DATA, COMPRISING A CIRCUIT FOR RECOGNIZING THE START OF PACKETS

[75] Inventors: André Guenot, Yerres; Christian J. R. Cantou, Combs la Ville, both of France

[73] Assignee: U.S. Philips Corporation, New York, N.Y.

[21] Appl. No.: 136,169

[22] Filed: Dec. 18, 1987

[30] Foreign Application Priority Data

Dec. 23, 1986 [FR] France ............... 86 18052

[51] Int. Cl.$^4$ .............................................. H04N 7/04
[52] U.S. Cl. ..................... 358/147; 370/106
[58] Field of Search ............... 358/147, 146, 142; 370/106

[56] References Cited

U.S. PATENT DOCUMENTS

| 4,479,146 | 10/1984 | Cohn | 358/147 |
| 4,520,394 | 5/1985 | Kaneko | 358/147 X |
| 4,600,943 | 7/1986 | Tanabe | 358/147 |
| 4,688,218 | 8/1987 | Bliueau et al. | 358/147 X |

FOREIGN PATENT DOCUMENTS 2496376  6/1982 France .
2077550 12/1981 United Kingdom .

OTHER PUBLICATIONS

C. Schwartz et al., "specification preliminaire diesysteme de Teletexte An tiope ® Radio Diffusion/Television", No. 27, Apr./May 1977.
BBC et al., "Broadcast Teletext: Specification" (Sep. 1976) pp. 1-20.

Primary Examiner—James J. Groody
Assistant Examiner—Victor R. Kostak
Attorney, Agent, or Firm—Thomas A. Briody; Jack E. Haken; Anne E. Barschall

[57] ABSTRACT

Arrangement for receiving numerical data transmitted in the form of multiplexed packets in the video channel of a television transmission system, particularly comprising a circuit for recognizing data whose output signal (V) is used to authorize the transfer of the data signal (D) from a demodulator to a demultiplexer by means of an switching circuit (16a). The circuit (160) for recognizing the data comprises a D flip-flop (31) receiving the data signal (D), an exclusive-OR gate (33) whose inputs receive the data signal (D) and the output signal (D') of the D flip-flop (31) and which supplies from its output a signal (DX) applied to the input of a synchronous control module (32) which stores a given sequence of successive states of its input (36) during the opening period of a time window generated by a window generator (34) and which supplies the recognition signal (V) for authorizing the transfer when the said sequence of successive states is essentially a sequence of high states. Application: reception of data transmitted by means of a system such as Antiope, Ceefax or Nabts.

7 Claims, 3 Drawing Sheets

ARRANGEMENT FOR RECEIVING NUMERICAL DATA, COMPRISING A CIRCUIT FOR RECOGNIZING THE START OF PACKETS

BACKGROUND OF THE INVENTION

1. Field of the Invention

The invention relates to an apparatus for receiving digital data transmitted in the form of multiplexed packets in the video channel of a television transmission system. The apparatus includes a demodulator provided with a data clock which can be synchronized to the reception of a bit synchronizing burst. The bit synchronizing burst is a sequence of n bits of alternately 1 and 0 present at the start of each data packet after a line synchronizing signal. The apparatus also includes a demultiplexer to which the data signals and the data clock signals from the demodulator can be transmitted. The apparatus has means for handling the data to be visualized on a screen. The apparatus also has a circuit for recognizing the data for authorizing the transfer of the numerical data to the demultiplexer by means of a recognition signal, if the start of a data packet has been recognized.

2. Related Art

It is known to transmit digital data in the form of multiplexed packets in the video channel of a television transmission system, notably for displaying information on this display screen. Such systems are known under the names of "ANTIOPE" in France, "CEEFAX" in Great Britain and NABTS in USA.

It is known that the transmission of digital data during the normal line scanning period starts with a transmission of a synchronizing burst of bits which are presented in the "ANTIOPE", NABTS and "CEEFAX" systems in the form of a 16-bit word which is identical for these two systems.

By nature, this type of transmission is not bilateral and it is thus necessary to obtain an identification upon reception, ensuring as much as possible that a line of digital data is present instead of an analogue video signal line which could accidentally show a certain resemblance to a start of the transmission of digital data.

For this purpose, it is known to provide a data recognition circuit supplying a recognition signal as early as possible in the course of the transmission corresponding to one television line. The recognition signal authorizes or prevents the transfer of digital data to the demultiplexer depending on whether this line presents the characteristic elements of a bit synchronizing burst at the start of reception.

An arrangement for receiving digital data as described in the opening paragraph is particularly known from the document FR-A-2,496,376.

In the presence of distorted and/or noise signals upon reception, notably when the distance between the transmitter and the receiver is large, the circuits for recognizing data operate with a certain rate of recognition of errors which may involve a rejection of a non-recognized data line or the erroneous recognition of a video signal line as a data line. From this point of view, it is desirable that the circuit for recognizing the data operate with an optimum tolerance to avoid excessive rejection of data lines in the presence of noise. The circuit should nevertheless provide a good safeguard against inadvertent validation of video signal lines.

If an apparatus for receiving digital data is to be realized which is capable of indifferently treating signals transmitted in accordance with the different standards (for example "ANTIOPE", NABTS and "CEEFAX") the circuit for recognizing the data should also be adaptable to the differences in specifications and particularly to the tolerances in the transmission standards of these systems.

SUMMARY OF THE INVENTION

The invention has for its object to provide an arrangement for receiving data, comprising a circuit for recognizing data which has a very good performance in the presence of noise signals at its input and which is also capable of easily adapting to different standards.

According to the invention an apparatus for receiving digital data of the type described in the opening paragraph is characterized in that the data recognition circuit comprises a D flip-flop, an exclusive-OR gate, a time window generator and a synchronous control module. The apparatus is further characterized in that the data signal supplied by the demodulator is applied to the data input of the D flip-flop and to one of the inputs of the exclusive-OR gate. The output signal of the D flip-flop is applied to the other input of the exclusive-OR gate. The output signal of the exclusive-OR gate is transmitted to the input of the synchronous control module which stores a sequence of given states of its input during the opening period of the time window and which supplies from its output the signal for recognizing the start of the packets when the sequence of successive states is essentially a sequence of "1" states (high states).

As soon as the data clock is synchronized on the first bits of the bit synchronizing burst, the output signal of the exclusive-OR gate has, in synchronism with the data clock, "1" states for a reception of bits which succeed one another in a regular alternation of 1 and 0. Consequently the synchronous control module can supply from its output a very reliable signal for recognizing the start of the packet. For this purpose it is sufficient that this control module which can be realized in different forms, stores a sequence of successive states of its input during the time interval determined by the opening of the time window and supplies from its output an authorization signal on the condition that this sequence of successive states corresponds to a sequence of states all of which are 1 or only has a limited number of 0 states among a majority of 1 states.

It is to be noted that where for the sake of simplicity an exclusive-OR gate is concerned whose 1 state at the output is representative of the reception of data when the data bits regularly alternate with one another, any equivalent apparatus can be used for effecting the modulo-2-sum of the data signal and of the same signal at the output of the D flip-flop.

In a first embodiment of the invention the apparatus is characterized in that the time window generator supplies an opening signal having a predetermined duration located within the limits of the bit synchronizing burst. The synchronous control module comprises a control D flip-flop set to a first state before opening of the time window and being locked in a state opposed to the first state as soon as a low state at the output of the exclusive-OR gate occurs during opening of the time window. The output signal of the control D flip-flop is applied upon closure of the window as a signal for recognizing the start of the packet.

The control D flip-flop is set, for example at 1 before the start of the time window and subsequently, during the opening period of this window, it is maintained at 1 when the data signal effectively has an alternating sequence of 1 and 0 bits. Subsequently, this flip-flop is locked in its state and supplies from its output the data recognition signal authorizing the transfer of data from the output of the demodulator to the demultiplexer.

If during the opening of the time window the sequence of data bits does not regularly alternate, the output of the exclusive-OR gate transmits 0 to the control flip-flop. The control flip-flop is then locked in this state during closure of the window, which state is utilized for inhibiting the transfer of data to the demultiplexer.

In a second embodiment according to the invention the apparatus is characterized in that the time window generator supplies an opening signal having a predetermined duration located within the limits of the bit synchronizing burst. The synchronous control module comprises two control D flip-flops arranged in cascade which are both set to a first state before opening of the time window. The first control D flip-flop is locked in the state opposed to the first state as soon as a first low state at the output of the exclusive-OR gate occurs during opening of the time window. The second control D flip-flop is locked in its state opposed to the case in which a second low state is produced at the output of the exclusive-OR gate during opening of the time window. The output signal of the second control D flip-flop is applied during closure of the said window as a signal for recognizing the start of the packet.

This embodiment is similar to the first embodiment but tolerates an identification error during the opening period of the time window, which optimizes the result in the case of a reception with parasitic signals or a considerable noise level. The second control D flip-flop is only locked at 0 after a second synchronous zero crossing of the output of the exclusive-OR gate, whilst the first zero crossing of this output only locks the first control D flip-flop. Thus the risk of erroneously rejecting a numerical data line due to the presence of an erroneous bit in the bit synchronizing signal received during opening of the time window is reduced.

In a third embodiment according to the invention the apparatus is characterized in that the time window generator supplies an opening signal having a predetermined duration located in a relatively wide range with respect to the bit synchronizing burst. The synchronous control module comprises a counting circuit of bits identified at the output of the exclusive-OR gate. The which counting circuit is programmed for counting a given number m which is lower than the number n of bits of the bit synchronizing burst, whose count is reset at each synchronous passage to the low state of its counting input. The output of the counting circuit supplies the signal for recognizing the start of the packet, which is locked when the count to m has been reached.

By choosing a time window which is relatively large with respect to the possible positions of the bit synchronizing signal, that is to say a window which may extend beyond the limits of the synchronizing signal, the effect due to delay variations separating the line synchronizing signal from the start of the data signal is eliminated in this case.

According to the transmission standard of certain systems, quite considerable variations may actually occur.

In this case, the time window does not have high precision positioning and may advantageously be opened some time before the start of the bit synchronizing burst and closed again some time after the end of this burst. In fact, the counting circuit of the synchronous control module will reset the counter as long as the regular and alternating sequence of data bits is not started and will provide either an enable signal if the number of 1 bits at the output of the exclusive-OR gate has reached a threshold value or an inhibit signal if this number has not reached said threshold value. The signal for opening (or closing) the time window can be used, if desired, for blocking the counting operation during the rest of the line period and thus increases the security of identification which is only useful during the transmission of the bit synchronizing burst.

In an advantageous embodiment, the time window generator is realized by means of a counting circuit which counts a given first number of data clock pulses from the line synchronizing signal, which subsequently supplies the signal for opening the window, then counts a given second number of data clock pulses corresponding to the opening period of the window and subsequently supplies a signal for closing the window.

It is thus very easy to optimize the identification process by modifying the threshold value and by considering the results obtained in different circumstances of reception and particularly in the presence of strong noise.

This flexible adaptation is also advantageous in the case of a multi-standard arrangement in which it is sufficient to program the loading of the threshold values which are most suitable for receiving transmission signals in accordance with a given transmission standard.

BRIEF DESCRIPTION OF THE DRAWINGS

The invention will now be described in greater detail by way of example with reference to the accompanying drawings in which.

DETAILED DESCRIPTION OF THE PREFERRED EMBODIMENT

Figure 1:
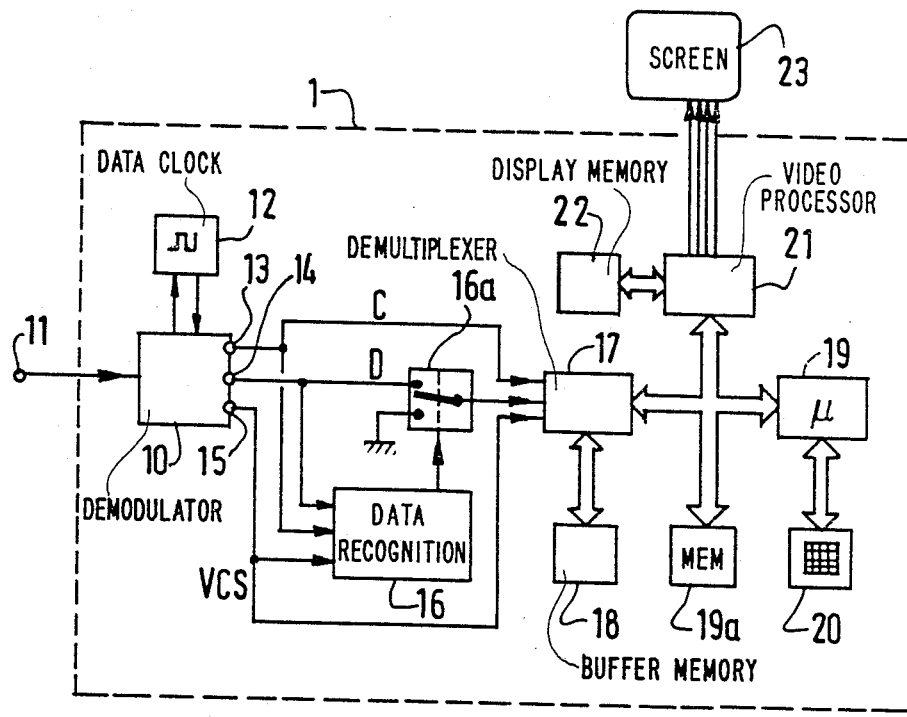
FIG. 1 is a general circuit diagram of a known digital data receiver.

FIG. 1 shows the general circuit diagram of an apparatus 1 for receiving digital data. It comprises a demodulator 10 to which the signal from the high-frequency and intermediate-frequency stage of the receiver is applied via the input terminal 11. The demodulator 10 is provided with a data clock 12 which can be synchronized by means of a bit synchronizing burst which is present at the start of each packet of data after the line synchronizing signal. The demodulator 10 supplies from its output a clock signal C via a terminal 13, a data signal D via a terminal 14 and an initiation signal VCS essentially corresponding to the inverse logic value of the analogue line synchronizing signal and being in phase with the clock signal C.

The data signal D is transmitted to an input of a demultiplexer 17 via a switching circuit 16a which is controlled by a data recognition circuit 16. The demultiplexer 17 also receives the clock signal C and the initiation signal VCS at two other inputs.

The data recognition circuit 16 receives the clock signal C, the data signal D and the initiation signal VCS at its input.

The apparatus 1 also comprises the means which are required to store the data and to use them, for example for conversion into characters which can be displayed on a screen. These means essentially comprise a buffer memory 18 associated with the demultiplexer 17, a control microprocessor 19 having a working memory 19a which receives the treated data at the output of the demultiplexer 17, a keyboard 20 connected by means of a bus to the control microprocessor 19 and a videoprocessor 21 with an associated display memory 22, the assembly providing the necessary signals for visualizing the information on a screen 23.

The data recognition circuit 16 is designed in such a way that it controls the switching circuit 16a on the operative side when a bit synchronizing burst is applied to the input terminal 11. When a television line comprising an analogue video signal is concerned, the data recognition circuit 16 does not authorize the transfer of the data signal D to the demultiplexer 17 by controlling the switching circuit 16a on the inoperative side.

The general structure of the apparatus 1 described above is typical of the state of the art, notably as described in the document FR-A-2,496,376.

Figure 2:
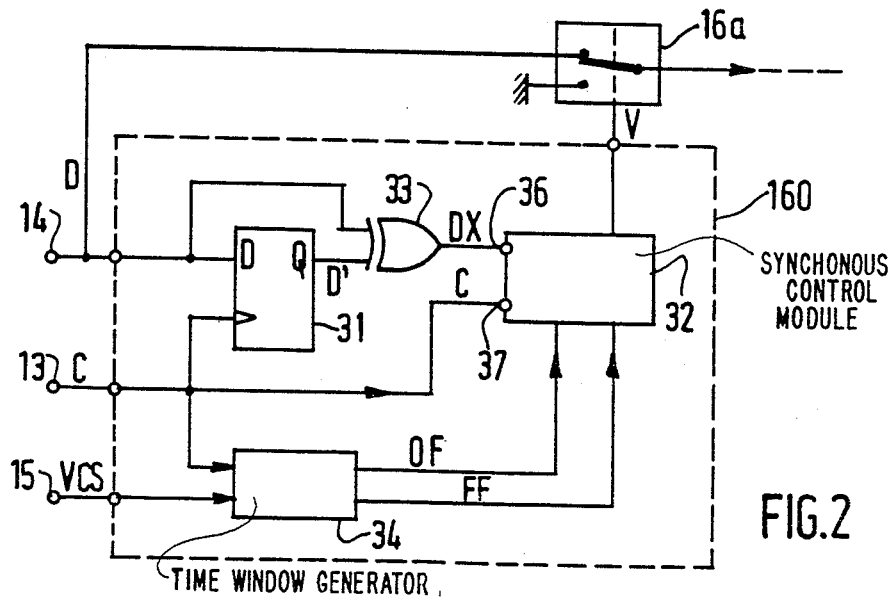
FIG. 2 shows a circuit for recognizing data including the data receiver according to the invention.

FIG. 2 shows a circuit diagram for realizing a data recognition circuit 160 having a function which is comparable to circuit 16 of FIG. 1 in an apparatus for receiving data according to the invention. This circuit 160 comprises a D flip-flop 31, a synchronous control module 32, an exclusive-OR gate 33 arranged between the D flip-flop 31 and the synchronous control module 32 and a time window generator 34. The clock signal C is applied to the clock input of the D flip-flop 31, to an input 37 of the synchronous control module 32 and to an input of the time window generator 34. The data signal D is applied to the data input of the D flip-flop 31 and to one of the inputs of the exclusive-OR gate 33. The output signal D' of the D flip-flop 31 is applied to the other input of this gate, whilst the output signal DX of the exclusive-OR gate 33 is applied to an input 36 of the synchronous control module 32.

The module 32 supplies from its output a signal V for recognizing the start of the packet, which signal controls the switching circuit 16a. The synchronous control module 32 receives a signal OF for opening the window and possibly a signal FF for closing the window, both signals being supplied by the time window generator 34 and obtained by counting the pulses of the clock signal C from an instant which is fixed by the initiation signal VCS.

During the reception of the bit synchronizing burst the data signal D must normally cause a regular succession of alternating states 1 and 0 to appear. Under these conditions the output of the exclusive-OR gate 33 supplies a signal DX which is always 1 at each passage of the clock pulse. If on the other hand the data signal D comprised two identical successive states, the exclusive-OR gate 33 would supply a signal DX of 0 which is an indication of an alternating error in the succession of received bits. During the opening period of the time window, which period is determined by the signal OF (or the combination of the signals OF and FF) the synchronous control module 32 stores a sequence of successive states of its input 36 and supplies a signal V which is 1 (for example) when this sequence of successive states only comprises 1 states in which case the signal V authorizes the transfer of the data signal through the switching circuit 16a for the period of one line.

As will be hereinafter described in greater detail, the signal V may also authorize the transfer the data signal D if there is not more than one, isolated error bit in the sequence of successive states of the output signal DX of the exclusive-OR gate 33.

Figure 3:
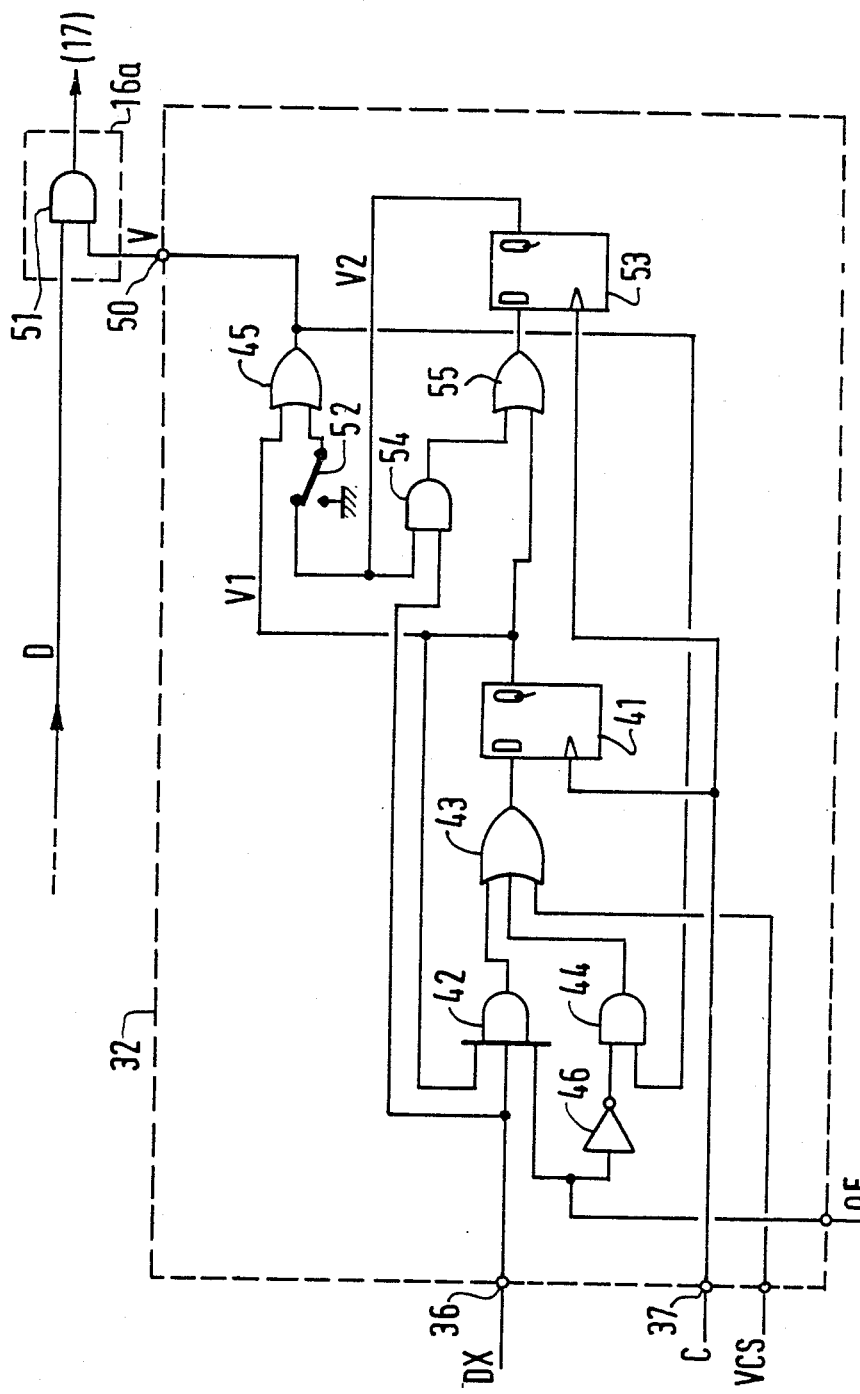
FIG. 3 shows a detailed logic circuit diagram of a part of the circuit of FIG. 2 in a first embodiment.

FIG. 3 shows a first embodiment of the control module 32 of FIG. 2 as well as its connection to the switching circuit 16a. It comprises a first control D flip-flop whose clock input receives the clock signal C from the terminal 37 and which receives the output signal DX of the exclusive-OR gate 33 via the terminal 36 successively via an AND gate 42 having three inputs and an OR gate 43 having three inputs. The output signal of the first control D flip-flop, referred to as V1 is forced to the 1 state by the initiation signal VCS which covers several clock pulses and which is transmitted by means of the OR gate 43 because this signal is applied to one of the three inputs of this gate.

The signal OF for opening the window changes to the state 1 when the bit synchronizing burst has already started. It is applied to one of the inputs of the AND gate 42. Since the signal V1 at the input of first control D flip-flop 41 is applied to one input of the AND gate 42 this first control D flip-flop 41 is automatically locked in the case in which it produces a first low state of the output signal DX of the exclusive-OR gate 33.

During the period preceding the opening of the window and after the initiation signal VCS has dropped to zero the first control D flip-flop 41 has its output maintained at 1 because the signal V1 is transmitted by means of an OR gate 45 to an AND gate 44 having two inputs the other input of which receives the inverse signal OF for opening the window by means of the inverter 46 whilst the output of the AND gate 44 is fed back to the input of the first control D flip-flop 41 by means of the OR gate 43.

During the opening period of the window the first control D flip-flop 41 is automatically locked at zero as soon as the signal DX passes through a first low state and because this low state transmitted at the output of the flip-flop 41 is fed back to an input of the AND gate 42.

When the time window closes, the signal OF for opening the window returns to the zero state. The state of the first control D flip-flop 41 is stored by the connection applying the output signal V1 via the OR gate 45 to the input of the AND gate 44 while a signal having a 1 state is applied to the other input of the same gate by means of the inverter 46.

The signal V1 which is thus stored is finally derived from the output terminal 50 as a signal V for recognizing the start of the packet. According to the embodiment shown in FIG. 3 the switching circuit 16a is simply constituted by an AND gate 51 which receives the signal V at one of its inputs and the data signal D at the other input, which signal is transmitted to the demultiplexer 17 in so far as the recognition signal V does not assume the value of zero. If the signal V has the value of 1 at the moment of closing the window, this transmission is continued for the remaining period of the line.

The part of the circuit of the synchronous control module 32 described so far operates by blocking the data signal D from the first zero crossing of the output signal DX of the exclusive-OR gate 33. According to this operating method the switch 52 is set to its inactive state, that is to say connected to ground.

When the switch 52 is in its active position the synchronous control module 32 may also function in accordance with a second method by means of a second control D flip-flop 53 which is automatically locked to zero because its output signal V2 is fed back to its input via the AND gate 54 and the OR gate 55.

The second control flip-flop 53 is first set to 1 in the same manner as the first control D flip-flop 41 because it receives from this flip-flop an output signal V1 set at 1 via the OR gate 55.

Because the signal V1 is shifted over one clock period of the signal DX at the first zero crossing of this signal, it is not immediately transmitted to the second control D flip-flop 53.

The first control D flip-flop 41 is locked at 0. If a second state 0 of the signal DX occurs during the opening period of the window, the AND gate 54 causes a zero to appear at the output and the second control D flip-flop 53 is locked at this state. By means of the switch 52 and the OR gate 45 it is thus possible to select the mode of locking indicated by the 0 value of signal V as soon as the first error is found in the signal DX or only when the second error is produced in this signal.

Figure 4:
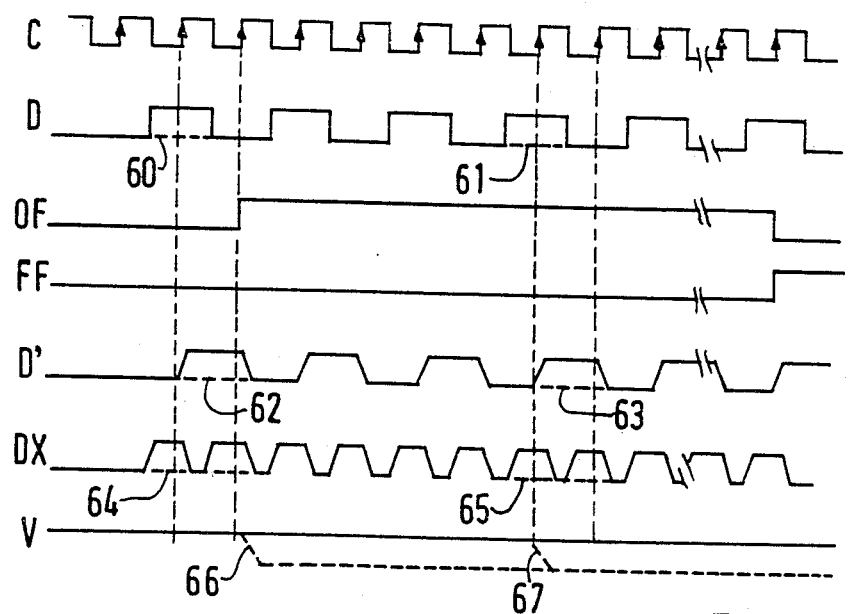
FIG. 4 shows a timing diagram of several signals applied to the input of the circuit of FIG. 3 or produced at different points in this circuit.

FIG. 4 shows a timing diagram of the clock signal C, the data signal D, the signal OF for opening the window, the signal FF for closing the window, the shifted data signal D' at the output of the D flip-flop 31, the output signal DX of the exclusive-OR gate 33 and the signal V for recognizing the start of the packet.

As already indicated the signal OF for opening the window is within fixed limits for the duration of the bit synchronizing burst. It changes to 1 during the opening period of the time window.

The signal FF for closing the window which is initially at 0 changes to 1 at the moment of closing the window. In the data signal D two bits 60 and 61 denoted by broken lines are shown which each correspond to an error of the data signal because it does not correspond to the regular alternation provided for the normal reception of the line synchronizing signal. The signal which is normally expected is the signal shown in solid lines.

The signal D', i.e. the data signal which is shifted in time by the D flip-flop 31, has the same error signals which are shifted in time as shown in broken lines denoted by 62 and 63. At the output of the exclusive-OR gate 33 the signal DX is represented by means of solid lines when the data signal D does not have an error and when it includes the signal shown in broken lines 64 and 65 in the presence of errors indicated at 60 and 61 in the signal D.

When the data signal D has a regular and alternating sequence of 1 and 0 bits, the signal DX is 1 at the moment of the leading edges of the clock signal C. As a consequence of the error bit indicated at 60 for the data signal D, the signal DX has a low level as is indicated by the broken line 64. The same applies to the error bit indicated at 61 in the data signal D producing the low state indicated by the broken line 65 for the signal DX.

The signal for recognizing the start of the packet V is set at 1 by means of the initiation signal VCS and is maintained in this state by the low state of the signal OF for opening the window by means of the inverter 46, the AND gate 44 and the OR gate 43 (FIG. 3).

As from the opening of the time window the first control D flip-flop 41 is locked at zero as soon as the first error occurs in the data signal D. When the apparatus of FIG. 3 is used with a locking of the data as from the first error of the data signal, that is to say with the switch 52 connected to ground, the signal V thus changes to the low state as indicated at 66, that is to say as from the first low state found in the signal DX. When the switch 52 is set to its active position and the arrangement of FIG. 3 functions with a tolerance of an error in the data signal D the signal V for recognizing the start of the packet changes to the low state only upon the passage of the second error, that is to say the error corresponding to the error 61 of the data signal D and to the signal 65 at the low state of the signal DX. The signal V for recognizing the start of the packet thus only changes to the low state as indicated by a broken line 67.

If the data signal D does not comprise any error in an alternation of 1 and 0 bits, the signal V for recognizing the start of the packet remains at 1 and this value is stored at the end of the time window.

It is to be noted that in the method to be described hereinafter the signal FF for closing the window is not used. According to a modification not shown in the Figure the output signal of the OR gate 45 (signal V1 or signal V2 dependent on the position of the switch 52) could be combined with the signal FF for closing the window at the input of a supplementary AND gate whose output would supply a recognition signal V. According to this modification the signal V would change to the 1 state for authorizing the transmission of data only as from the closure of the time window.

Figure 5:
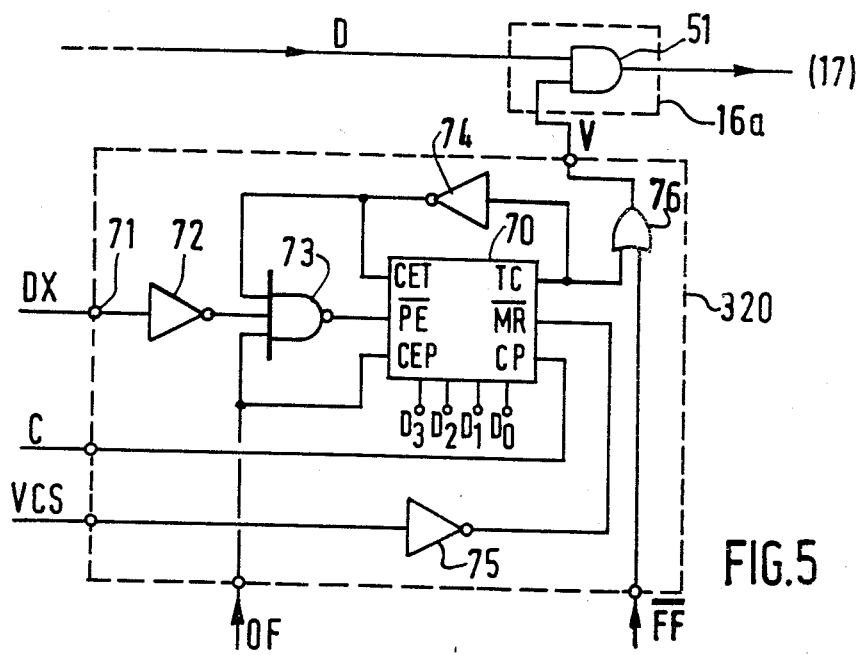
FIG. 5 shows the logic circuit diagram of a second embodiment of a part of the circuit shown in FIG. 2.

FIG. 5 shows another method of using the synchronous control module 32 of FIG. 2. In this case the control module 320 essentially comprises a counting circuit comprising a counter 70 which counts down a predetermined number, for example the number 8, programmed at its preset inputs D0 to D3. The terminal 71 which receives the output signal DX of the exclusive-OR gate 33 constitutes the counting input of the counting circuit. The terminal 71 is connected to the terminal $\overline{PE}$ of the counter 70 for initiating the count which is active in the low state, via an inverter 72 and a NAND gate 73 having three inputs. Another input of the NAND gate 73 is connected to the terminal CET of the counter 70 for authorizing the count and receives the signal for ending the count from the terminal TC of the counter 70 for ending the count via an inverter 74. The third input of the NAND gate 73 receives the signal OF for opening the window and it is also connected to the second terminal CEP of the counter 70 for authorizing the count. The clock signal C is applied to the clock signal terminal CP of the counter 70 which is a synchronous counter and counts down at each clock pulse when the enable inputs CET and CEP are both in the 1 state. The general initiation terminal $\overline{MR}$ of the counter 70 which is active at the low state receives the initiation signal VCS via an inverter 75.

According to this method the signal OF for opening the window is chosen in such a manner that it starts before the bit synchronizing burst and finishes at the moment of the end of this burst or a short time after the end of this burst. Under these conditions, when the signal OF for opening the window changes to the 1 state, the counter 70 is reloaded to its initial count at each zero crossing of the signal DX until its signal indicating the end of the count is a zero again and the three inputs of the NAND gate 73 are in the 1 state.

When the successive 1 and O bits of the bit synchronizing burst appear in the data signal D, the signal DX produces a sequence in the state 1 so that the counter 70 will count down. When the signal DX produces a sufficient sequence of successive 1 states, the counter 70 reaches the end of its count and its signal indicating the end of the count supplied from the terminal TC is taken via an OR gate 76 for supplying the signal V for recognizing the start of the packet. The other input of the OR gate 76 receives a signal FF which is the inverse logical value of the signal FF for closing the window.

If during the count an identification error occurs which is represented by the presence of a low state of the signal DX, the counter 70 is reset to its initial count and starts to count down. It reaches the end of its count in so far as the number of 1 states of the signal DX is sufficient. If this is not the case, as in the reception of a video signal line, the signal FF changes to zero at the moment of closing the window and subsequently the signal V does the same. The signal V will then be locked in this state for the rest of the line period.

The signal V for recognizing the start of the packet is applied to the AND gate 51 of the switching circuit 16*a* and controls the transfer of the data signal D to the demultiplexer 17.

It is to be noted that the circuits described with reference to FIGS. 3 and 5 have been given by way of non-limiting examples and that other methods of realizing the invention can be derived therefrom by using equivalent logic means.

The time window generator as is indicated by 34 in FIG. 2 does not need to be described in detail. It is advantageously realized by means of a counting circuit which counts a given first number of data clock pulses from the line synchronizing signal, which provides the signal OF for opening the window, then counts a given second number of data clock pulses corresponding to the opening period of the window and thus it provides a signal FF for closing the window, whilst at the same moment the signal OF for opening the window returns to its initial state.

The apparatus for receiving digital data according to the invention is essentially based on a digital treatment of the data signal. It thus provides the advantage of reliable operation and at the same time a great flexibility of programming the operating conditions.

What is claimed is:

1. An apparatus for receiving digital data transmitted in the form of multiplexed packets in the video channel of a television transmission system, comprising:
   a. a demodulator including:
      i. means for generating data clock signals synchronized with reception of a bit synchronizing burst which is a sequence of n bits of alternating first and second logic levels at a start of each data packet after a line synchronizing signal, and
      ii. means for supplying data signals,
   b. a demultiplexer for receiving and demultiplexing the data signals and the data clock signals from the demodulator,
   c. means for handing data to be viewed on a screen, and
   d. a circuit for authorizing transfer of the data signals to the demultiplexer by supplying a recognition signal if the start of a data packet has been recognized, comprising:
      i. a flip-flop having a data input coupled to receive the data signals from the demodulator and an output,
      ii. means for effecting a modulo-2-sum, the effecting means having first and second inputs and an output, the first input being coupled to receive the data signals from the demodulator, the second input being coupled with the output of the flip-flop,
      iii. a time window generator for generating a time window which is open during an open period, and
      iv. a synchronous control module having an input, coupled with the output of the effecting means, for storing a sequence of given states of its input during the open period of the time window and which synchronous control module has an has an output for supplying said recognition signal when the sequence of states is essentially a sequence of said first logic level.

2. The apparatus of claim 1, wherein
   a. the time window generator supplies an open signal having a predetermined duration located within limits of the bit synchronizing burst, and
   b. the synchronous control module comprises
      i. a control D flip-flop set to a first state before the open signal and being locked in a second state opposed to the first state as soon as an instance of said second logic level at the output of the effecting means occurs during the open signal, the control D flip-flop having an output signal which is applied upon closure of the time window as said recognition signal.

3. The apparatus of claim 1, wherein
   a. the time window generator supplies an open signal having a predetermined duration located within limits of the bit synchronizing burst, and
   b. the synchronous control module comprises:
      i. a first control D flip-flop set to a first state before the open signal, the first control D flip-flop being locked in a second state opposed to the first state as soon as a first instance of said second logic level occurs at the output of the effecting means during the open period of the time window, and
      ii. a second control D flip-flop set to the first state before the open signal and arranged in cascade with the first control D flip-flop, the second control D flip-flop being locked in the second state as soon as a second instance of said second logic level occurs at the output of the effecting means during the open signal, an output signal of the second control D flip-flop being applied during closure of the time window as said recognition signal, whereby there must be at least two errors in the bit synchronizing burst in order for the bit synchronizing burst not to be recognized by the synchronous control module.

4. The apparatus of claim 1, wherein
   a. the time window generator supplies an open signal having a predetermined duration located within a range which is relatively wide range with respect to the bit synchronizing burst, and
   b. the synchronous control module comprises a counting circuit for counting bits appearing at the output of the effecting means, which counting circuit comprises
i. a counting input coupled to the output of the effecting means, and
ii. an output for supplying said recognition signal, the counting circuit being programmed for counting a given number m which is lower than n, a count of the counting circuit being reset at each synchronous passage to said second logic level of a signal appearing at the counting input, said recognition signal being locked when the count reaches m.

5. The apparatus of claim 1 wherein the effecting means is an exclusive-OR gate.

6. The apparatus of claim 1 wherein the flip-flop is a D flip-flop.

7. The apparatus as claimed in claim 1, 2, 3, or 4, wherein
a. the time window generator comprises a counting circuit which
   i. counts a given first number of data clock pulses from the line synchronizing signal,
   ii. subsequently supplies an open signal,
   iii. then counts a given second number of data clock pulses corresponding to the open period of the time window and
   iv. subsequently supplies a signal for closing the time window.

* * * * *